US005457009A

United States Patent [19]

Toyoda, et al.

[11] Patent Number: 5,457,009

[45] Date of Patent: Oct. 10, 1995

[54] SILVER HALIDE PHOTOGRAPHIC MATERIAL AND METHOD FOR PROCESSING THE SAME

[75] Inventors: Takashi Toyoda, deceased, late of Hadano, Japan, by Harumi Toyoda; Eiichi Okutsu; Kouta Fukui, both of Ashigara, Japan

[73] Assignee: Fuji Photo Film Co., Ltd., Kanagawa, Japan

[21] Appl. No.: 214,305

[22] Filed: Mar. 17, 1994

[30] Foreign Application Priority Data

Mar. 18, 1993 [JP] Japan .................................... 5-058807

[51] Int. Cl.[6] .............................. C03C 1/34; C03C 1/76; C03C 5/31

[52] U.S. Cl. .......................... 430/399; 430/428; 430/523; 430/611; 430/488; 430/489

[58] Field of Search .................................... 430/611, 613, 430/614, 963, 463, 428, 488, 489, 445, 523

[56] References Cited

U.S. PATENT DOCUMENTS

| | | | |
|---|---|---|---|
| 2,173,628 | 9/1938 | Kendall | 430/611 |
| 2,195,150 | 3/1940 | Kendall | 430/611 |
| 2,231,127 | 2/1941 | Kendall | 430/611 |
| 2,304,962 | 12/1942 | Sheppard et al. | 430/611 |
| 4,526,857 | 7/1985 | Idota | 430/611 |
| 4,839,273 | 6/1989 | Yamada et al. | 430/428 |
| 5,049,483 | 9/1991 | Yatsuyanagi et al. | 430/613 |
| 5,242,791 | 9/1993 | Hirano et al. | 430/613 |
| 5,385,811 | 1/1995 | Hirano | 430/488 |

FOREIGN PATENT DOCUMENTS

| | | | |
|---|---|---|---|
| 0247473 | 12/1987 | European Pat. Off. | 430/611 |
| 51-21580 | 7/1976 | Japan | 430/551 |
| 58-217928 | 12/1983 | Japan | 430/611 |
| 61-132944 | 6/1986 | Japan | 430/611 |

*Primary Examiner*—Charles L. Bowers, Jr.
*Assistant Examiner*—J. Pasterczyk
*Attorney, Agent, or Firm*—Sughrue, Mion, Zinn, Macpeak & Seas

[57] ABSTRACT

A method of processing a photographic material having, in the backing layer, at least one mercapto pyrimidine compound of formula (I), with an automatic developing machine, where the amount of the replenisher of the developer per unit area of the material being processed is reduced. The processed materials have stable photographic properties and few silver stains. The mercapto pyrimidine has the following structure

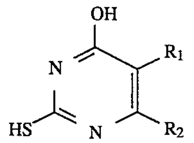

(I)

wherein $R_1$ and $R_2$ each represents a hydrogen atom, an alkyl group, an aryl group, an aralkyl group, a hydroxyl group, a mercapto group, a carboxyl group, a sulfo group, a phosphono group, a nitro group, a cyano group, a halogen atom, an alkoxycarbonyl group, an aryloxycarbonyl group, a carbamoyl group, a sulfamoyl group or an alkoxy group. The sum of the carbon atoms contained in $R_1$ and $R_2$ is from 2 to 20. $R_1$ and $R_2$ may be bonded to each other to form a ring structure.

8 Claims, No Drawings

SILVER HALIDE PHOTOGRAPHIC MATERIAL AND METHOD FOR PROCESSING THE SAME

FIELD OF THE INVENTION

The present invention relates to a silver halide photographic material and to a process for processing the material using an automatic developing machine. In particular, it relates to a method for developing a silver halide photographic material with a developer using an automatic developing machine, in which an amount of a replenisher to the developer per the unit area of the material to be processed is reduced. The photographic materials processed by the method of the present invention have stable photographic properties and few silver stains.

BACKGROUND OF THE INVENTION

A black-and-white silver halide photographic material is generally processed, after having been exposed, by a process comprising development, fixation, rinsing and drying. Recently, the process is mostly carried out with an automatic developing machine. In general, the development of the material using such an automatic developing machine is effected with replenishing a determined amount of a developer in proportion to the area of the material being processed. It has heretofore been desired to obtain stable photographic properties of the material developed and processed in this manner. It has also been desired to reduce the amount of the replenisher per the unit area of the material being processed, with still obtaining stable photographic properties of the processed material. Heretofore, when a so-called sheet-shaped photographic material such as an X-ray photographic material or graphic art photographic material is processed, it is general to replenish a replenisher of the developer in an amount of 250 ml or more, especially 330 ml or more, per $m^2$ of the material being processed.

However, since a waste from photographic development has a high chemical oxygen demand (C.O.D.) or has a high biological oxygen demand (B.O.D.), chemical or biological treatment is applied to the waste so as to make it non-toxic prior to draining the waste. As such treatment of the photographic waste is a great economical burden to the users, a development method of needing a reduced amount of replenisher to the developer is desired.

SUMMARY OF THE INVENTION

The object of the present invention is to provide a silver halide photographic material and a method for processing the silver halide photographic material using an automatic developing machine, wherein an amount of a replenisher of the developer per the unit area of the material being processed is reduced, and the silver halide photographic materials processed by the method of the present invention have stable photographic properties and have few silver stains, even though the amount of the replenisher of the developer being used in the method is reduced.

The object has been attained by a silver halide photographic material comprising a support having at least one silver halide emulsion layer on one surface of the support and having a backing layer on the back surface of the support and a method for processing the silver halide photographic material, wherein the backing layer contains a compound represented by formula (I):

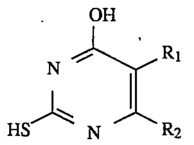

(I)

wherein $R_1$ and $R_2$,each represents a hydrogen atom, an alkyl group, an aryl group, an aralkyl group, a hydroxyl group, a mercapto group, a carboxyl group, a sulfo group, a phosphono group, a nitro group, a cyano group, a halogen atom, an alkoxycarbonyl group, an aryloxycarbonyl group, a carbamoyl group, a sulfamoyl group or an alkoxy group; the sum of the carbon atoms contained in $R_1$ and $R_2$ is from 2 to 20 (preferably from 3 to 12); and $R_1$ and $R_2$ may be bonded to each other to form a ring structure.

DETAILED DESCRIPTION OF THE INVENTION

Specific examples of compounds represented by formula (I) which are usable in the present invention are shown below, but these are not limitative particularly.

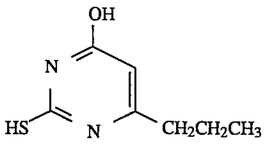

(1)

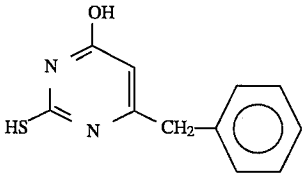

(2)

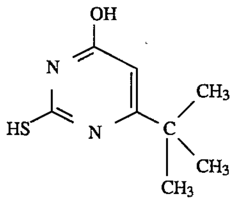

(3)

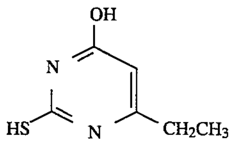

(4)

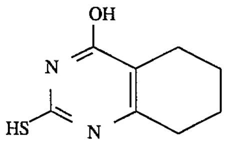

(5)

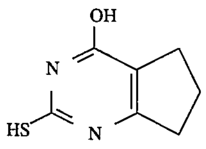

(6)

-continued

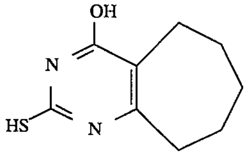
(7)

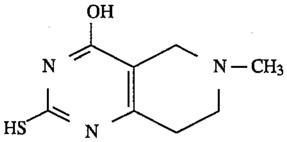
(8)

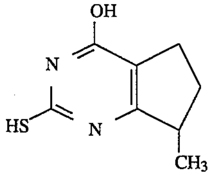
(9)

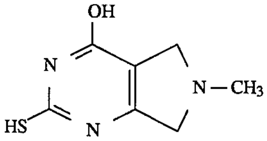
(10)

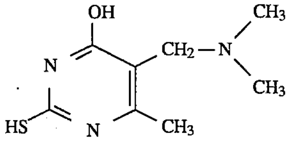
(11)

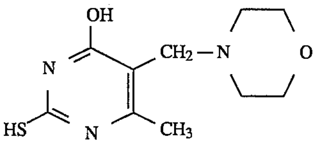
(12)

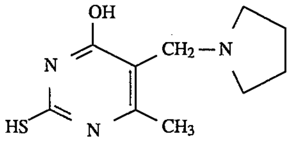
(13)

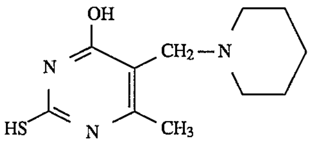
(14)

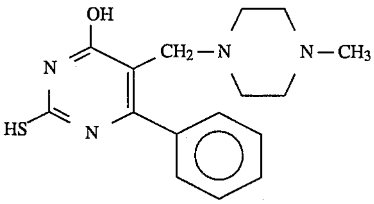
(15)

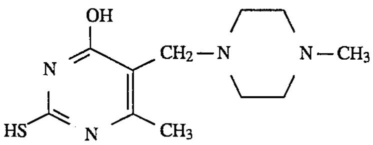
(16)

-continued

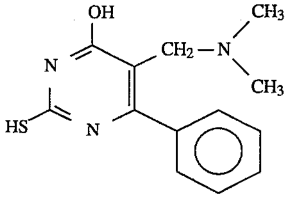
(17)

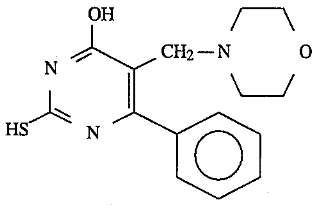
(18)

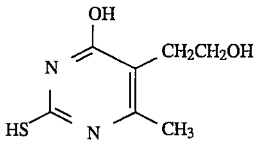
(19)

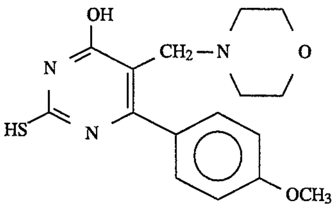
(20)

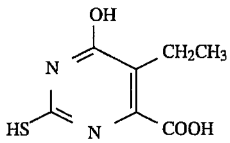
(21)

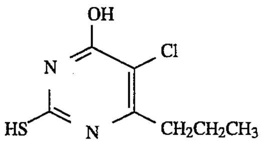
(22)

Among the above compounds, Compounds (1), (3), (4), (5), (6), (7), (8), (9), (10) and (21) are particularly preferred.

These compounds of formula ( I ) may be produced easily, for example, by the methods described in *Comprehensive Heterocyclic Chemistry*, Vol. 3, pp. 40–56, pp. 106–142 and pp. 179–191, and *The Journal of American Chemical Society*, Vol. 67, pp. 2197–2200 (1945).

The backing layer of the photographic material of the present invention may contain compound(s) represented by formulae (II) and/or (III), along with compound(s) represented by formula (I).

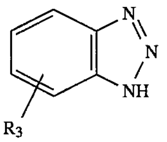
(II)

-continued (III)

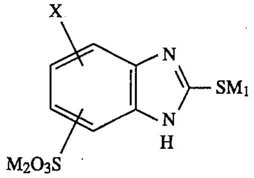

wherein $R_3$ represents a hydrogen atom, an alkyl group having from 1 to 5 carbon atoms, or a halogen atom; X represents a hydrogen atom or a sulfonic acid group; $M_1$ represents a hydrogen atom or an alkali metal atom; and $M_2$ represents a hydrogen atom, an alkali metal atom or an ammonium group.

Incorporation of compound(s) of formulae (II) and/or (III) along with compound(s) of formula (I) into the backing layer of the photographic material of the present invention is preferred in view of the object of the present invention for reducing the formation of silver stains in the processed photographic material. Specific examples of compounds represented by formula (II) and (III) are shown below, which, however, are not limitative particularly.

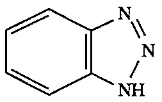

(23)

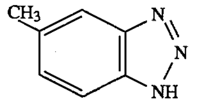

(24)

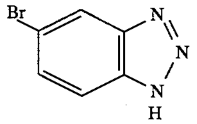

(25)

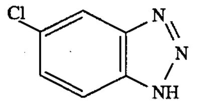

(26)

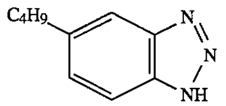

(27)

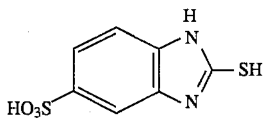

(28)

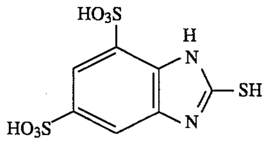

(29)

Among the above compounds, Compounds (24) and (27) as the compound of formula (II) and Compounds (28) and (29) as the compound of formula (III) are particularly preferred.

The amount of compound(s) represented by formula (I) and optionally compound(s) represented by formulae (II) and (III) to be incorporated into the backing layer in the photographic material of the present invention is preferably from 0.1 mg to 1 g, especially preferably from 1 mg to 500 mg, per $m^2$ of the material.

Hydrophilic colloids are preferably used in the backing layer. The backing layer comprises surface protective layer(s), backing layer(s) and subbing layer(s). The above-mentioned compounds of the present invention may be incorporated into any one or more of these layers. The backing layer may contain coating aids, antistatic agents, sliding property improvers, dyes, matting agents, surfactants, etc., in addition to hydrophilic colloids. The thickness of the backing layer unit is preferably from 1.5 to 4 μm and more preferably from 2.0 to 3.0 μm.

The backing layer as referred to herein includes all layers that are coated on the surface of the support opposite to the surface thereof coated with silver halide emulsion layer(s). For instance, it includes surface protective layers and subbing layers on the back surface of the support.

The silver halide grains in the photographic emulsion layers constituting the photographic material of the present invention may be those having a regular crystal such as cubic, octahedral or tetradecahedral forms, or may also be those having an irregular crystal such as spherical, tabular or pebble-like forms. A mixture comprising various grains with different crystalline forms may also be used in the present invention.

The photographic emulsions which can be used in the present invention may contain iridium ions.

For incorporating iridium ions in the emulsions, generally employed is a method of adding an aqueous solution of a water-soluble iridium compound (e.g., hexachloroiridates(IV), etc.) to the reaction system of forming silver halide emulsions during the formation of the silver halide emulsions. Concretely, the iridium compound may be added to the reaction system simultaneously with the aqueous solutions for forming silver halide grains. Specifically, it may be added thereto before formation of the grains, during the formation of the grains or after the formation of the grains but before the chemical sensitization of them. Especially preferably, it is added to the reaction system during the formation of the grains.

The amount of iridium ions to be added to the emulsion is preferably from $1\times10^{-8}$ to $1\times10^{-5}$ mol, more preferably from $1\times10^{-7}$ to $1\times10^{-6}$, per mol of the silver halide formed.

The composition of the silver halide in the silver halide emulsion to be used in the present invention is, for example, a silver halide comprising chloride and/or bromide, such as silver bromide, silver chlorobromide, etc.

Where silver chlorobromide is employed, the silver chloride content in the silver halide is preferably from 70 to 100 mol %, more preferably from 90 to 100 mol %.

In carrying out the present invention, monodispersed emulsions are preferably used. For preparing mono-dispersed emulsions for use in the present invention, the speed for adding the aqueous silver nitrate solution and the water-soluble halide solution(s) may be accelerated with the growth of the silver halide grains being formed. By the acceleration, the distribution of the grain sizes of the grains formed may be narrowed and the grains may be monodispersed. In addition, since the time for adding them may be shortened, the acceleration is advantageous for industrial production of the emulsion grains. In addition, the acceleration is also preferred since the formation of structural defects in the inside of the silver halide grains formed is reduced.

For the acceleration, the speed of adding the aqueous silver salt solution and the aqueous halide solution(s) may be elevated either continuously or intermittently. The upper-most limit of the accelerated speed may be just below the flow rate at which new grains will be formed and is determined depending upon the temperature of the reaction system, the pH thereof, the pAg thereof, the degree of stirring of the system, the composition of the silver halide grains being formed, the solubility of the grains, the grain size of the grains, the grain-to-grain distance of the grains, and the kind and concentration of the protective colloid used.

The silver halide emulsions for use in the present invention may be core/shell type mono-dispersed emulsions, and the core/shell emulsions are known, for example, in JP-A-54-48521 (The term "JP-A" as used herein means an "unexamined published Japanese Patent application").

The amount of the silver halide emulsion(s) to be coated on the support for forming the photographic material of the present invention is preferably 5 g or less, more preferably from 1 to 3 g, per $m^2$ of the material as Ag on one side surface of the support.

The mono-dispersed emulsions for use in the present invention are emulsions that have a grain size distribution of preferably 0.3 or less, more preferably 0.20 or less, as the fluctuation coefficient (S/r) relative to the grain size of the silver halide grains, where r indicates a mean grain size and S indicates a standard deviation relative to the grain size.

The photographic material of the present invention is preferably spectral-sensitized to 600 nm or more. In general, the photographic materials that have been spectral-sensitized to 600 nm or more are characterized in that the development inhibition of the materials due to adsorption of spectral-sensitizing dyes to the silver halide grains is small and that the development acceleration of them is large. However, when the photographic materials thus spectral-sensitized in this manner are processed by the method of the present invention, the effect of the invention is noticeable.

For spectral-sensitizing the silver halide emulsions of the present invention, usable are at least one of tricarbocyanine dyes and 4-quinoline nucleus-containing dicarbocyanine dyes, such as those described in JP-A-63-89838, and also cyanine dyes, merocyanine dyes and mixtures of them.

Such the spectral-sensitizing dyes may be added to the silver halide photographic emulsions of the present invention in an amount of from $1\times10^{-7}$ to $1\times10^{-2}$ mol, preferably from $1\times10^{-6}$ to $1\times10^{-3}$ mol, per mol of the silver halide in the emulsion.

The spectral-sensitizing dyes may be added to the emulsions generally after the chemical sensitization of the emulsions, but they may also be added thereto even during the formation of the grains or before the chemical sensitization of them. For dissolving the dyes added to the emulsions, ultrasonic waves may be employed.

For the addition, the methods described in U.S. Pat. Nos. 2,912,343, 3,342,605, 2,996,287 and 3,429,935 may also be employed. The spectral-sensitizing dyes may be uniformly dispersed in the silver halide emulsions before their coating on a suitable support. Nevertheless, they may be added to and dispersed in the emulsions at any stage of forming the emulsions.

Other sensitizing dyes may also be used in the present invention. For instance, usable are spectral-sensitizing dyes described in U.S. Pat. Nos. 3,703,377, 2,688,545, 3,397,060, 3,615,635, 3,628,964, British Patent 1,242,588, 1,293,862, JP-B-43-4936, JP-B-44-14040, JP-B-43-10773, U.S. Pat. No. 3,416,927, JP-B-43-4930, U.S. Pat. Nos. 3,615,613, 3,615,632, 3,617,295 and 3,635,721 (The term "JP-B" as used herein means an "examined Japanese Patent publication"). These spectral-sensitizing dyes may be combined with the above-mentioned infrared-sensitizing dyes for use in the present invention.

Along with the above-mentioned sensitizing dyes, usable are the compounds described in JP-A-63-89838 for the purpose of attaining supersensitization of the photographic material.

In addition, a storability-improving agent such as, for example, the compounds described in JP-A-63-89838 may be combined with the above-mentioned sensitizing dyes to be incorporated into the photographic emulsions in an amount of approximately from 0.01 to 5 g per mol of the silver halide in the emulsion.

The photographic emulsion layers and other hydrophilic colloid layers that constitute the photographic material of the present invention may contain various surfactants for various purposes of coating aid, prevention of static charges, improvement of sliding property, improvement of emulsification and dispersion, prevention of surface adhesion and improvement of photographic properties (for example, in acceleration of development, elevation of hardness, sensitization).

As the antistatic agent, especially preferred are fluorine-containing surfactants or polymers such as those described in U.S. Pat. No. 4,201,586, JP-A-60-80849, JP-A-59-74554, JP-A-60-249021, JP-A-61-32462; anionic surfactants such as those described in JP-A-60-76742, JP-A-60-80846, JP-A-60-80848, JP-A-60-80839, JP-A-60-76741, JP-A-60-208743, JP-A-62-172343, JP-A-62-173459, JP-A-62-215272; conductive polymers or latexes (nonionic, anionic, cationic, amphoteric ones) such as those described in JP-A-57-204540 and JP-A-62-215272. As the inorganic antistatic agent, preferred are conductive tin oxide and zinc oxide and also composite oxides prepared by doping antimony to the metal oxides, such as those described in JP-A-57-118242.

Examples of the hardening agent which can be used in the present invention include aldehyde compounds such as mucochloric acid, mucobromic acid, mucophenoxychloric acid, mucophenoxybromic acid, formaldehyde, dimethylolurea, trimethylolmelamine, glyoxal, monomethyl-glyoxal, 2,3-dihydroxy-1,4-dioxane, 2,3-dihydroxy-5-methyl-1,4-dioxane, succinaldehyde, 2,5-dimethoxytetrahydrofuran, glutaraldehyde; active vinyl compounds such as divinylsulfone, methylene-bismaleimide, 5-acetyl-1,3-diacryloyl-hexahydro-s-triazine, 1,3,5-triacryloyl-hexahydro-striazine, 1,3,5-trivinylsulfonyl-hexahydro-s-triazine, bis(vinylsulfonylmethyl)ether, 1,3-bis(vinylsulfonylmethyl)propanol- 2-bis(α-vinylsulfonylacetamido)ethane; active halogen compounds such as 2,4-dichloro-6-hydroxy-s-triazine sodium salt, 2,4-dichloro-6-methoxy-s-triazine, 2,4-dichloro-6-(4-sulfonylino)-s-triazine sodium salt, 2,4-dichloro-6-(2-sulfoethylamino)-s-triazine, N,N'-bis(2 -chloroethylcarbamyl)piperazine; epoxy compounds such as bis(2,3-epoxypropyl)methylpropylammonium p-toluenesulfonate, 1,4-bis(2',3'-epoxypropyloxy)butane, 1,3,5-triglycidyl isocyanate, 1,3-diglycidyl-5-(γ-acetoxy-β-hydroxypropyl)isocyanate; ethylenimine compounds such as 2,4, 6-triethylenimino-s-triazine, 1,6-hexamethylene-N,N'-bis-ethylene-urea, bis-β-ethyleniminoethyl-thioether; methanesulfonate compounds such as 1,2-di(methanesulfonoxy-)ethane, 1,4-di(methanesulfonoxy)butane, 1,5-di(methanesulfonoxy)pentane; carbodiimide compounds; isoxazole compounds; and inorganic compounds such as chromium alum.

As the matting agent which can be used in the present invention are fine grains of homopolymers (e.g., polymethyl methacrylate) and copolymers of methyl methacrylate and methacrylic acid, as well as fine grains of organic compounds (e.g., starch) and inorganic compounds (e.g., silica, titanium dioxide, strontium sulfate, barium), such as those described in U.S. Pat. Nos. 2,992,101, 2,701,245, 4,142,894, 4,396,706. The grain size of the agent is preferably from 1 to 10 μm, especially preferably from 2 to 5 μm.

The surface layers of the photographic material in the present invention may contain, as a sliding agent, silicone compounds such as those described in U.S. Pat. Nos. 3,489, 576, 4,047,958, colloidal silica as described in JP-B-56-23139, as well as paraffin wax, higher fatty acid esters, starch derivatives, etc.

The hydrophilic colloid layers of the photographic material in the present invention may contain, as a plasticizer, polyols such as trimethylol-propane, pentanediol, butanediol, ethylene glycol, glycerin, etc.

The hydrophilic colloid layers of the photographic material in the present invention may contain a polymer latex for the purpose of improving the pressure resistance of the material. As the polymers, preferred are homopolymers of alkyl acrylates, copolymers of alkyl acrylates and acrylic acid, styrene-butadiene copolymers, and homopolymers and copolymers comprising active methylene-containing monomers.

The silver halide photographic emulsion layers, interlayers, protective layers, anti-halation layers and backing layers constituting the photographic material of the present invention may contain, as the binder, the above-mentioned gelatin, as well as acylated gelatins such as phthalated gelatin and malonated gelatin, cellulose compounds such as hydroxyethyl cellulose and carboxymethyl cellulose, soluble starches such as dextrin, and hydrophilic polymers such as polyvinyl alcohol, polyvinyl-pyrrolidone, polyacrylamide and polystyrene-sulfonic acid. Of them, especially preferred is a combination of gelatin, dextran and polyacrylamide.

The total amount of gelatin contained in the silver halide photographic material of the present invention is 3.5 g or less.

The silver halide photographic material of the present invention may have light-insensitive layers such as surface protective layers, interlayers, anti-halation layers, etc., in addition to the light-sensitive silver halide emulsion layers.

The photographic material of the present invention may have two or more silver halide emulsion layers, which may have different sensitivities and gradients. If desired, the both surfaces of the support may have one or more silver halide emulsion layers and light-insensitive layers.

The support of the photographic material in the present invention is preferably a polyethylene terephthalate film or cellulose triacetate film, which is especially preferably colored in blue. In order to elevate the adhesiveness of the support and hydrophilic colloid layers to be coated thereover, the surface of the support is preferably treated by corona-discharging, glow-discharging or ultraviolet irradiation. If desired, a subbing layer made of a styrene-butadiene latex or polyvinylidene latex may be provided on the support, and a gelatin layer may be superposed over the subbing layer. Also, a subbing layer may be provided on the support, using an organic solvent containing a polyethylene swelling agent and gelatin. The surface of the subbing layer may be treated so as to elevate its adhesiveness to hydrophilic colloid layers to be coated thereover.

The photographic material of the present invention may contain an anti-halation dye and/or an anti-irradiation dye having substantial absorption in a long wavelength range of 750 nm or more. An anti-halation dye may be incorporated into interlayers, subbing layers, anti-halation layers, backing layers and emulsion layers that constitute the photographic material; an anti-irradiation dye may be incorporated into emulsion layers and interlayers. The amount of these dyes to be in the material may be preferably from $1\times10^{-3}$ to 1 g/m$^2$, more preferably from $1\times10^{-3}$ to 0.5 g/m$^2$. For instance, the dyes described in U.S. Pat. Nos. 2,895,955, 3,177,078 and 4,581,325, and JP-A-50-100116, and the dyes described in JP-A-63-23148 and JP-A-63-89838 are preferably used in the present invention. The dyes may be used singly or as a combination of two or more of them.

In place of the above-mentioned dyes or along with the above dyes, other dyes may also be used. Examples of other dyes include pyrazolonoxonole dyes such as those described in U.S. Pat. No. 2,274, 782, diarylazo dyes such as those described in U.S. Pat. No. 2,956, 879, styryl dyes and butadienyl dyes such as those described in U.S. Pat. Nos. 3,423,207 and 3,384,487, merocyanine dyes such as those described in U.S. Pat. No. 2,527,583, merocyanine dyes and oxonole dyes such as those described in U.S. Pat. Nos. 3,486,897, 3,652,284 and 3,718,472, and enamino-hemioxonole dyes such as those described in U.S. Pat. No. 3,976, 661.

It is desired to reduce the amount of the replenisher to be used in processing the photographic material of the present invention, and the object is to reduce the economic expense for the treatment of the waste liquids to be drained in the processing and also to reduce the user's running cost, as so mentioned above. In addition, the space for the replenisher tank may be reduced so that the scale of the automatic developing machine to be used for processing the photographic material in the present invention may be small-sized. The preferred amount of the replenisher is generally 200 ml/m$^2$ or less, preferably from 25 ml/m$^2$ to 200 ml/m$^2$, especially preferably from 50 ml/m$^2$ to 180 ml/m$^2$.

The developing agent to be preferably used in the developer in the present invention is a dihydroxybenzene developing agent. The agent includes, for example, hydroquinone, hydroquinone-monosulfonic acid, chlorohydroquinone, bromohydroquinone, isopropylhydroquinone, methylhydroquinone, 2,3-dichlorohydroquinone, 2,4-dichlorohydroquinone, 2,3-dibromohydroquinone, and 2,4-dimethylhydroquinone. Of these, especially preferred is hydroquinone. The content of the developing agent in the developer is generally from 0.05 mol/liter to 0.8 mol/liter.

Combination of the preceding dihydroxybenzene developing agent and 1-phenyl-3-pyrazolidones or p-aminophenols is preferably employed in carrying out the present invention.

Examples of 1-phenyl-3-pyrazolidones include 1 -phenyl-3-pyrazolidone, 1-phenyl-4,4-dimethyl-3-pyrazolidone, 1-phenyl-4-methyl-4-hydroxymethyl-3-pyrazolidone, 1-phenyl-4,4-dihydroxymethyl-3-pyrazolidone, and 1-phenyl-5-methyl-3-pyrazolidone.

Examples of p-aminophenols include N-methyl-p-aminophenol, N-(β-hydroxyethyl)-p-aminophenol, N-(4-hydroxyphenyl)glycine, 2-methyl-p-aminophenol, and p-benzylaminophenol. Of them, preferred is N-methyl-p-aminophenol.

Where the dihydroxybenzene developing agent is used in combination with an auxiliary developing agent of, for example, 1-phenyl-3-pyrazolidones or p-aminophenols, it is preferred that the former is from 0.05 mol/liter to 0.5 mol/liter (particularly from 0.1 mol/liter to 0.3 mol/liter) to the developer and that the latter is from 0.001 to 0.06 mol/liter, more preferably from 0.003 to 0.06 mol/liter (most preferably from 0.005 mol/liter to 0.05 mol/liter) to the same.

The developer which can be used in the present invention may contain a sulfite, such as sodium sulfite, potassium sulfite, lithium sulfite, ammonium sulfite, sodium bisulfite, potassium metabisulfite or formaldehydesodium bisulfite. The content of the sulfite in the developer may be preferably 0.10 mol/liter or more, especially preferably 0.20 mol/liter or more. The upper limit of the sulfite is preferably up to 2.5 mol/liter, especially preferably up to 1.2 mol/liter.

The developer may also contain an amino compound for acceleration of the developability. For example, amino compounds described in JP-A-56-106244 JP-A-61-267759, and JP-A-2-208652 may be used.

The pH value of the developer is preferably from 9 to 12, more preferably from 9.5 to 11. For defining the pH value of it, an alkali agent may be incorporated into the developer. In general, a water-soluble inorganic alkali metal (such as sodium hydroxide, sodium carbonate) may be employed.

The replenisher of the developer to be used in the present invention may contain a pH buffer such as boric acid, borax, sodium secondary phosphate, potassium secondary phosphate, sodium primary phosphate or potassium primary phosphate. In addition, pH buffers described in JP-A-60-93433 are also employable. It may further contain a development inhibitor such as potassium bromide or potassium iodide, and an organic solvent such as dimethylformamide, methyl cellosolve, hexylene glycol, ethanol and methanol. It may also contain a benzotriazole derivative such as 5-methylbenzotriazole, 5-bromobenzotriazole, 5-chlorobenzotriazole, 5-butylbenzotriazole and benzotriazole. Of them, especially preferred is 5-methylbenzotriazole. It may also contain a nitroindazole compound such as 5-nitroindazole, 6-nitroindazole, 4-nitroindazole, 7-nitroindazole and 3-cyano-5-nitroindazole. Of them, especially preferred is 5-nitroindazole. Where such a 5-nitroindazole compound is incorporated into the developer, it may be previously dissolved in a part separately from the part containing the dihydroxybenzene developing agent and the sulfite preservative, and the two parts are mixed along with water before use, in general. The part in which a 5-nitroindazole compound is dissolved is advantageously alkaline, since the alkaline part is colored in yellow and is conveniently handled.

If desired, the developer may further contain a color toning agent, a surfactant, a hard water softener and a hardening agent.

The developer may contain a chelating agent. Specific examples of the chelating agents include, for example, ethylenediaminediorthohydroxyphenylacetic acid, diaminopropanetetraacetic acid, nitrilo-triacetic acid, hydroxyethylethylenediamine-triacetic acid, dihydroxyethylglycine, ethylenediamine-diacetic acid, ethylenediamine-dipropionic acid, imino-diacetic acid, diethylenetriamine-pentaacetic acid, hydroxyethylimino-diacetic acid, 1,3-diaminopropanol-tetraacetic acid, triethylenetetramine-hexaacetic acid, transcyclohexanediamine-tetraacetic acid, ethylenediaminetetraacetic acid, glycoletherdiamine-tetraacetic acid, ethylenediaminetetrakismethylenephosphonic acid, diethylenetriaminepentamethylenephosphonic acid, nitrilotrimethylenephosphonic acid, 1-hydroxyethylidene-1,1-diphosphonic acid, 1,1-diphosphonoethane-2-carboxylic acid, 2-phosphonobutane- 1,2,4-tricarboxylic acid, 1-hydroxy-1-phosphonopropane- 1,3,3-tricarboxylic acid, catechol-3,5-disulfonic acid, sodium pyrophosphate, sodium tetrapolyphosphate, and sodium hexametaphosphate. Of them, especially preferred are diethylenetriamine-pentaacetic acid, triethylenetetramine-hexaacetic acid, 1,3-diaminopropanol-tetraacetic acid, glycolether-diamine-tetraacetic acid, hydroxyethylethylenediamine-triacetic acid, 2-phosphonobutane- 1,2,4-tricarboxylic acid, 1,1-diphosphonoethane-2-carboxylic acid, nitrilotrimethylenephosphonic acid, ethylenediamine-tetraphosphonic acid, diethylenetriamine-pentaphosphonic acid, 1-hydroxypropylidene-1,1-diphosphonic acid, 1-aminoethylidene-1,1-diphosphonic acid, 1-hydroxyethylidene-1,1-diphosphonic acid, and their salts.

The developer which can be used in the present invention may contain the compounds described in JP-B-62-4702 and JP-B-62-4703, JP-A-1-200249, Japanese Patent Application Nos. 3-94955, 3-112275, 3-233718 and 4-362942, for the purpose of preventing silver stains in the processed photographic material.

In addition, other additives such as those described in L. F. A Maison, Photographic Processing Chemistry (published by Focal Press, 1966), pp. 226–229, U.S. Pat. Nos. 2,193,015 and 2,592,364 and JP-A-48-64933 may also be added to the developer.

In accordance with the method of the present invention, the developer is replenished in an amount of generally 200 ml or less, preferably from 25 to 200 ml, especially preferably from 50 to 180 ml, per $m^2$ of the photographic material processed, during development of the material.

The original developer to be charged in the development tank of the automatic developing machine to be employed for processing the photographic material in accordance with the method of the present invention may be the same one as above or may also have a composition partially different from that of the developer.

The fixer to be employed in the method of the present invention is an aqueous solution containing a thiosulfate, and the fixer has pH of 4.8 or more, preferably from 4.9 to 6.5.

Examples of a fixing agent which can be contained in the fixer include, for example, sodium thiosulfate and ammonium thiosulfate. The amount of the fixing agent contained in the fixer may be varied suitably. In general, it may be approximately from 0.1 to 3 mol/liter.

The fixer may contain, if desired, a preservative (such as sulfites, bisulfites), a pH buffer (such as acetic acid, boric acid), a pH adjuster (such as sulfuric acid), a hard water-softening chelating agent, and compounds as described in JP-A-62-78551.

The fixer generally contains a water-soluble aluminium salt as a hardening agent.

In accordance with the method of the present invention, photographic materials are, after having been developed and fixed, then rinsed in water or treated with a stabilizer and thereafter dried.

Automatic developing machines of various types of, for example, roller-conveying type or belt-conveying type may be employed in carrying out the method of the present invention. Preferably employed is a roller-conveying type automatic developing machine. Using an automatic developing machine having a development tank having a small opening ratio, such as those described in JP-A-1-166440 and JP-A-1-193853, aerial oxidation or evaporation of the developer may be reduced so that operation of the process stable to the processing environment may be effected and the amount of the replenisher of the system may be reduced further much.

As a method of reducing the amount of the replenisher of the rinsing tank, a multi-stage countercurrent system (for example, comprising two or more stages) has been known from the past. Where the multi-stage countercurrent system is applied to the method of the present invention, the fixed photographic material may be conveyed gradually to the clearer direction, or that is, gradually to the .direction of the processing tank which is less stained by the fixer used. As a result, more effective rinsing may be effected by the system.

In the water-saving process or pipeless process, a microbicidal means is preferably applied to the rinsing water or to the stabilizer.

As such a microbicidal means, employable are, for example, an ultraviolet irradiating method as described in JP-A-60-263939, a method of using a magnetic field as described in JP-A-60-263940, a method of using an ion-exchange resin to form a pure water as described in JP-A-61-131632, and a method of using a microbicide as described in JP-A-61-115154, JP-A-62-153952, JP-A-62-22095, and JP-A-62-209532.

In addition, also employable are bactericides, fungicides and surfactants as described in L. F. West, Water Quality Criteria, *Photo. Sci. & Eng.*, Vol. 9, No. 6 (1965); N. W. Beach, Microbiological Growths in Motion-Picture Processing, *SMPTE Journal*, Vol. 85 (1976); R. D. Deegan, Photo Processing Wash Water Boicides, *J. Imaging Tech.*, 10, No. 6 (1984); and JP-A-57-8542, JP-A-57-58143, JP-A-58-105145, JP-A-57-132146, JP-A-58-18631, JP-A-57-97530 and JP-A-57-157244.

In addition, isothiazoline compounds described in R. T. Kreiman, J. Image. Tech., 10, (6), p. 242 (1984); isothiazoline compounds as described in Research Disclosure, Vol. 205, No. 20526 (May 1981); isothiazoline compounds as described in ibid., Vol. 228, No. 22845 (April 1983); and compounds as described in JP-A-62-209532 may also be added to the rinsing bath or stabilizing bath as a microbicide.

Moreover, the bath may also contain compounds as described in H. Horiguchi, *Antimicrobial Antifungal Chemistry* (published by Sankyo Shuppan Co. in 1982) and *Antimicrobial Antifungal Technical Handbook* (edited by Nippon Bokin Bobai Gakkai, published by Hakuho-do in 1986).

Where the rinsing of the photographic material as processed by the method of the present invention is effected with a small amount of rinsing water, squeeze roller rinsing tanks as described in JP-A-63-18350 are more preferably employed. A rinsing step of the constitution described in JP-A-63-143548 is also preferably employed.

A part or all of the overflow from the rinsing or stabilizing tank which is generated by replenishment of a rinsing replenisher to which the microbicidal means has been applied to the tank may be circulated back to the fixing solution in the previous bath.

The "development step time" as referred to herein indicates the time needed from the start of dipping the top of the photographic material to be processed in the developer tank of an automatic developing machine to the start of dipping it in the next fixer tank; the "fixation time" indicates the time needed from the start of dipping the material in the fixer tank to the start of dipping it in the next rinsing tank (or stabilizer tank); and the "rinsing time" indicates the time which is dipping the fixed material in the rinsing tank.

The "drying time" as referred to herein indicates the time while the processed photographic material is in a drying zone of an automatic developing machine, a hot air of from 35° C. to 100° C., preferably from 40° C. to 80° C. being blown into the drying zone.

Further, in the preceding part of the drying zone, a heating means which heats the rollers which are in contact with the photographic material processed, at 70° C. or higher is provided.

In accordance with the method of the present invention, the development time may be preferably from 5 seconds to one minute, more preferably from 5 seconds to 30 seconds; and the development temperature is preferably from 18° C. to 50° C., more preferably from 20° C. to 40° C.

In accordance with the method of the present invention, the fixing temperature and the fixing time are preferably approximately from 18° C. to 50° C. and from 5 seconds to one minutes, more preferably from 20° C. to 40° C. and from 5 seconds to 30 seconds, respectively. Within the defined ranges, sufficient fixation may be completed and the incorporated sensitizing dyes may well be dissolved out to such a degree that the residual color is not generated on the processed photographic material.

The temperature and the time for the rinsing step (or stabilizing step) are preferably from 0° to 50° C. and from 6 seconds to one minute, more preferably from 15° C. to 40° C. and from 6 seconds to 30 seconds, respectively.

In accordance with the method of the present invention, the developed, fixed and rinsed (or stabilized) photographic material is squeezed with squeeze rollers to remove the rinsing water remaining in the material and then dried. The drying is effected at approximately from 40° C. to 100° C., and the drying time may well be varied depending upon the environmental condition. In general, the drying time may well be approximately from 5 seconds to one minute, especially preferably approximately from 5 seconds to 30 seconds, when the drying temperature is from 40° to 80° C.

Where a photographic material is processed by the method of the present invention of a dry-to-dry system for development of 100 seconds or less, it is more preferred to apply rubber rollers to the outlet of the developer tank, as so described in JP-A-63-151944; or to elevate the discharging flow rate for stirring the developer in the developer tank to 10 m/min or more, as so described in JP-A-63-151943; or to apply stronger agitation at least to the developer during operation than to the developer of being on standby state, as so described in JP-A-63-264758. For rapid processing, the constitution of the rollers in the fixer tank is preferably in the form of a pair of facing rollers (i.e., opposed rollers) so as to elevate the fixing rate. By employing such facing rollers, the number of the necessary rollers may be reduced and the processing tank may be small-sized. That is, the automatic developing machine to be employed may be small-sized.

In the present invention, the whole processing time (i.e., the dry to dry time) is preferably from 20 to 120 seconds.

The present invention will be explained in more detail by way of the following examples, which, however, are not intended to restrict the scope of the present invention.

EXAMPLE 1

1. Preparation of Silver Halide Emulsion:

34 g of gelatin were dissolved in 850 ml of water in a container and heated at 51° C., and then 1.7 g of sodium chloride, 0.1 g of potassium bromide and 75 mg of the following compound (A) were added to the container:

$$HO—(CH_2)_2—S—(CH_2)_2—S—(CH_2)_2—OH.$$

Next, 500 ml of an aqueous solution containing 170 g of silver nitrate and 500 ml of an aqueous solution containing potassium hexachloroiridate(III) in a ratio of $5\times10^{-7}$ as a molar ratio of iridium to the completed silver halide, 12 g of sodium chloride and 96 g of potassium bromide were added to the container by a double-jet method, to prepare a mono-dispersed emulsion of cubic silver chlorobromide grains having a mean grain size of 0.4 μm. The emulsion was de-salted, and 60 g of gelatin were added thereto. This was adjusted to have a pH of 6.5 and a pAg of 8.1 and then subjected to chemical sensitization at 65° C. by adding 2 mg of sodium thiosulfate and 5 mg of chloroauric acid thereto. Next, 0.2 g of 4-hydroxy-6 -methyl-1,3,3a,7-tetrazaindene were added to the emulsion, which was then rapidly cooled to be solidified. The emulsion thus prepared is hereinafter referred to as Emulsion A.

Next, a mono-dispersed emulsion of cubic silver chlorobromide grains having a mean grain size of 0.3 μm was prepared in the same manner as above, except that the aqueous gelatin solution was heated at 40° C. After the emulsion was de-salted, 60 g of gelatin were added thereto. The emulsion was adjusted to have a pH of 6.5 and a pAg of 8.1 and then subjected to chemical sensitization at 65° C. by adding 2 mg of sodium thiosulfate and 5 mg of chloroauric acid thereto. Next, 0.2 g of 4-hydroxy-6-methyl-1,3,3a,7-tetrazaindene were added to the emulsion, which was then rapidly cooled to be solidified. The emulsion thus prepared is hereinafter referred to as Emulsion B.

Emulsions A and B were blended in a weight ratio of 1:1, and the following additives were added to the blend to prepare a coating emulsion (solution). The amounts of the additives mentioned below are per mol of the silver halide in the emulsion.

Formulation of Coating Emulsion (Solution):

| | | |
|---|---|---|
| (a) | Spectral Sensitizing Dye (1) | $1.0 \times 10^{-4}$ mol |
| (b) | Supersensitizing Agent (1) | $0.7 \times 10^{-3}$ mol |
| (c) | Storability Improving Agent | $1 \times 10^{-3}$ mol |
| (d) | Polyacrylamide (molecular weight: 40,000) | 10 g |
| (e) | Dextran | 5 g |
| (f) | Trimethylolpropane | 1.6 g |
| (g) | Sodium Polystyrenesulfonate | 1.2 g |
| (h) | Latex of Poly(ethyl acrylate/methacrylic acid) | 12 g |
| (i) | N,N'-ethylenebis-(vinylsulfonacetamide) | 2.0 g |
| (j) | 1-Phenyl-5-mercapto-tetrazole | 50 mg |
| (k) | Stabilizer | 50 mg |

Spectral Sensitizing Dye (1):

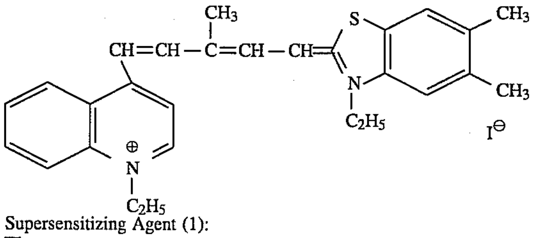

Supersensitizing Agent (1):

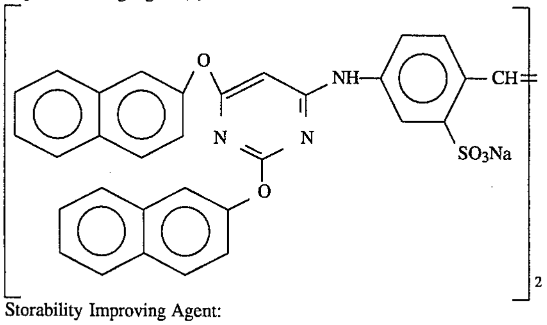

Storability Improving Agent:

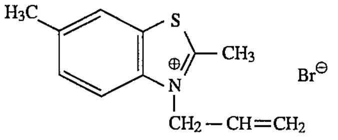

-continued

Stabilizer:

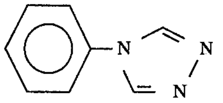

2. Preparation of Surface Protective Layer Coating Solution for Protective Emulsion Layer:

A container was heated at 40° C., and the following chemicals were added thereto to prepare a coating solution.

Formulation of Surface Protective Layer Coating Solution for Protective Emulsion Layer:

| | | |
|---|---|---|
| (a) | Gelatin | 100 g |
| (b) | Polyacrylamide (molecular weight: 40,000) | 12 g |
| (c) | Sodium Polystyrenesulfonate (molecular weight: 600,000) | 0.6 g |
| (d) | N,N'-ethylenebis-(vinylsulfonacetamide) | 1.8 g |
| (e) | Fine Grains of Polymethyl Methacrylate (mean grain size: 2.0 μm) | 2.7 g |
| (f) | Sodium T-octylphenoxyethoxyethane-sulfonate | 1.8 g |
| (g) | $C_{16}H_{33}O-(CH_2CH_2O)_{10}-H$ | 4.0 g |
| (h) | Sodium Polyacrylate | 6.0 g |
| (i) | $C_8F_{17}SO_3K$ | 70 mg |
| (j) | $C_8F_{17}SO_2N(C_3H_7)(CH_2CH_2O)_4(CH_2)_4-SO_3Na$ | 70 mg |
| (k) | NaOH (1N) | 6 ml |
| (l) | Methanol | 90 ml |
| (m) | 1-Phenyl-5-mercapto-tetrazole | 80 mg |
| (n) | Compound (B) | 0.06 g |

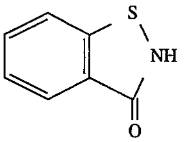

3. Preparation of Backing Layer Coating Solution:

A container was heated at 40° C., and the following chemicals were added thereto to prepare a backing layer coating liquid.

Formulation of Backing Layer Coating Solution:

| | | |
|---|---|---|
| (a) | Gelatin | 100 g |
| (b) | Dye (1) | 4.2 g |
| (c) | Sodium Polystyrenesulfonate | 1.2 g |
| (d) | Latex of Poly(ethyl acrylate/methacrylic acid) | 5 g |
| (e) | N,N'-ethylenebis-(vinylsulfonacetamide) | 4.8 g |
| (f) | Compound (B) | 0.06 g |
| (g) | Dye (2) | 0.3 g |
| (h) | Dye (3) | 0.05 g |
| (i) | Colloidal Silica | 15 g |

Dye (1):

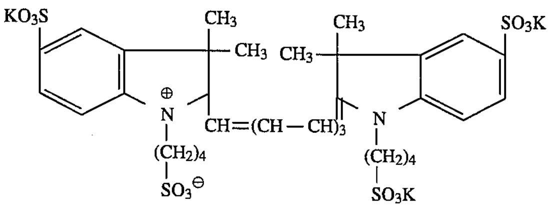

-continued

Dye (2):

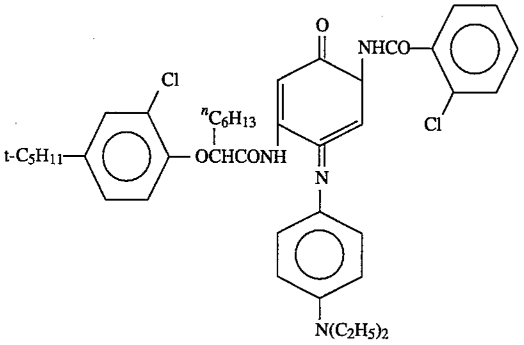

Dye (3):

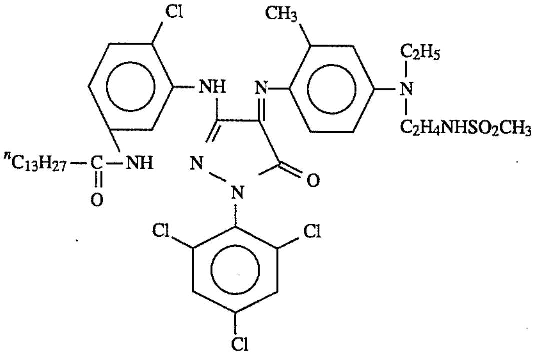

The compound or compounds shown in Table 1 below, which falls/fall within the scope of formula (I), was/were added to the backing layer coating solution to prepare additional four coating solutions shown in Table 1.

TABLE 1

| | Backing Layer Coating Solution | Amount of Compound(s) |
|---|---|---|
| A | (comparative sample) | No compound was added. |
| B | (sample of the present invention) | 50 mg/m$^2$ of Compound (5) were added. |
| C | (sample of the present invention) | 50 mg/m$^2$ of Compound (6) were added. |
| D | (comparative sample) | 10 mg/m$^2$ of Compound (24) and 50 mg/m$^2$ of Compound (28) were added. |
| E | (sample of the present invention) | 50 mg/m$^2$ of Compound (5), 10 mg/m$^2$ of Compound (24) and 50 mg/m$^2$ of Compound (28) were added. |

Compounds (24) and (28) added to Coating Solutions D and E are compounds described in JP-A-3-266831 and JP-A-4-43343.

4. Preparation of Back Surface Protective Layer Coating Solution:

A container was heated at 40° C., and the following chemicals were added thereto to prepare a coating solution. Formulation of Back Surface Protective Layer Coating Solution:

| | | |
|---|---|---|
| (a) | Gelatin | 100 g |
| (b) | Sodium Polystyrenesulfonate | 0.5 g |
| (c) | N,N'-ethylenebis-(vinylsulfonacetamide) | 1.9 g |
| (d) | Fine Grains of Polymethyl Methacrylate | 4 g |

-continued

| | | |
|---|---|---|
| | (mean grain size: 4.0 μM) | |
| (e) | Sodium T-octylphenoxyethoxyethane-sulfonate | 2.0 g |
| (f) | NaOH (1N) | 6 mg |
| (g) | Sodium Polyacrylate | 2.4 g |
| (h) | $C_{16}H_{33}O—(CH_2CH_2O)_{10}—H$ | 4.0 g |
| (i) | $C_8F_{17}SO_3K$ | 70 mg |
| (j) | $C_8F_{17}SO_2N(C_3H_7)(CH_2CH_2O)_4(CH_2)_4—SO_3Na$ | 70 mg |
| (k) | Methanol | 150 ml |
| (l) | Compound (B) | 0.06 g |

5. Formation of Photographic Material Samples:

One of the above-mentioned backing layer coating solutions A to E was coated on one surface of a polyethylene terephthalate support along with the coating solution for protecting the backing layer, the total gelatin amount in the coated layers being 3.0 g/m$^2$.

Next, the emulsion layer coating solution and the surface protective layer coating solution mentioned above were coated on the opposite surface of the support, the coated silver amount being 2.3 g/m$^2$ and the gelatin amount in the coated surface protective layer being 1.0 g/m$^2$. Thus, photographic material samples A to E were formed.

| | | |
|---|---|---|
| 6. | Preparation of Concentrated Developer: | |
| | Potassium Hydroxide | 50 g |
| | Diethylenetriamine-pentaacetic Acid | 5 g |
| | L-ascorbic Acid | 13.2 g |
| | Potassium Carbonate | 70 g |
| | Sodium Sulfite | 87.5 g |
| | Potassium Sulfite | 110 g |
| | Hydroquinone | 87.5 g |
| | Diethylene Glycol | 50 g |
| | 4-Hydroxymethyl-4-methyl-1-phenyl-3-pyrazolidone | 12.5 g |
| | 5-Methylbenzotriazole | 0.15 g |
| | 2,3,5,6,7,8-Hexahydro-2-thioxo-4(1H)quinazolinone | 0.25 g |
| | Sodium 2-Mercaptobenzimidazole-5-sulfonate | 0.35 g |
| | Potassium Bromide | 3.75 g |
| | Water to make | 1 liter |
| | (pH was adjusted to 11.0 with potassium hydroxide.) | |
| 7. | Preparation of Concentrated Fixer: | |
| | Ammonium Thiosulfate | 540 g |
| | Sodium Thiosulfate 5-Hydrate | 60 g |
| | Disodium Ethylenediaminetetraacetate 2-Hydrate | 0.12 g |
| | Sodium Metabisulfite | 52 g |
| | Sodium Hydroxide | 46 g |
| | Acetic Acid (90 wt. %) | 120 g |
| | Water to make | 1 liter |
| | (pH was adjusted to 5.1 with sodium hydroxide.) | |

As an automatic developing machine, used was a modified FCR-7000 Model Laser Image Printer Type CR-LP414 (manufactured by Fuji Photo Film Co., Ltd.) in which the driving shaft was reformed so that the conveyance of a film to be processed therein from insertion of it into the machine to taking out of the processed film from the outlet of the drier needed 45 seconds.

3 m$^2$/day of each of Samples A to E was processed with the machine every day for 3 weeks, with replenishing a diluted developer and a diluted fixer each in an amount of 300 ml (100 ml/m$^2$), as a running test. The diluted developer was prepared by blending 400 ml of the concentrate developer and 600 ml of water. The diluted fixer was prepared by blending 250 ml of the concentrated fixer and 750 ml of water. In carrying out the running test, the automatic developing machine was modified in such a way that the concentrated developer and fixer were directly and automatically fed into the developer tank and the fixer tank, respectively, while water was fed to the both tanks also automatically to prepare the diluted developer and fixer in the tanks. The results obtained by the test with respect to the photographic properties of the processed samples and the silver stains are shown in Table 2 below. The sensitivity as referred to therein indicates a relative value to the sensitivity of each sample film as processed with the fresh developer of being 100, which is a reciprocal of the amount of exposure of giving an optical density of (fog+0.1). The fog indicates an optical density of the non-exposed area including the support. Dm indicates the maximum density.

As is apparent from the results in Table 2 below, the running processability of the photographic material samples of the present invention was good. Specifically, the processed samples of the present invention all had stable photographic properties and few silver stains even though the amounts of the replenishers of the developer and fixer tanks were reduced to 100 ml/$m^2$.

the condition of 40° C. over a period of 5 minutes. Next, a solution of 64 g of silver nitrate in 280 ml of distilled water and a solution of 22.4 g of sodium chloride and 0.04 g of $K_4Fe(CN)_6.3H_2O$ in 285 ml of distilled water were added to and blended under the condition of 40° C. over a period of 5 minutes.

The emulsion thus obtained was observed with an electron microscope to be composed of cubic grains having a mean edge length of about 0.21 μm and a fluctuation coefficient of grain size distribution of 9.8%.

The emulsion was de-salted, and 72 g of gelatin and 2.6 g of phenoxyethanol were added thereto. This was adjusted to have a pH of 6.7 and a pAg of 7.9 with NaCl, and then chemically sensitized at 58° C. in accordance with the process mentioned below. First, a monodispersed silver bromide emulsion having a mean grain size of 0.05 μm was added thereto in an amount of 1 mol % as silver halide, then 7.2 mg of the following compound (C), 9.2 mg of chloroauric acid, 1.3 mg of triethylthiourea, 0.72 mg of the following selenium sensitizing agent and 0.29 g of nucleic acid and finally 162 mg of 4-hydroxy-6-methyl-1,3,3a,7-tetrazaindene were added thereto and rapidly cooled for solidification to obtain Emulsion A.

| | Photographic Properties, processed with fresh processing solutions | | | Photographic Properties, after running test for 3 weeks | | | |
|---|---|---|---|---|---|---|---|
| Sample | Fog | Sensitivity | Dm | Fog | Sensitivity | Dm | Silver Stains |
| A (comparative sample) | 0.15 | 100 | 3.4 | 0.32 | 175 | 3.25 | One week after the start of the running test, silver stains formed and adhered to the processed samples. |
| B (sample of the present invention) | 0.15 | 102 | 3.45 | 0.15 | 99 | 3.42 | Three weeks after the start of the running test, a few silver stains formed but did not adhere to the processed samples. All the processed samples were good. |
| C (sample of the present invention) | 0.15 | 101 | 3.39 | 0.15 | 101 | 3.35 | Three weeks after the start of the running test, a few silver stains formed but did not adhere to the processed samples. All the processed samples were good. |
| D (comparative sample) | 0.15 | 98 | 3.38 | 0.22 | 139 | 3.22 | Two week after the start of the running test, silver stains formed and adhered to the processed samples. |
| E (sample of the present invention) | 0.15 | 98 | 3.42 | 0.15 | 102 | 3.45 | No silver stains formed. All the processed samples were excellent. |

EXAMPLE 2

1. Preparation of Silver Halide Emulsion A:

32 g of gelatin was added to 900 ml of distilled water and dissolved therein at 40° C., and the pH of the resulting solution was adjusted to 3.8 with sulfuric acid. 3.3 g of sodium chloride was added thereto. A solution of 32 g of silver nitrate in 200 ml of distilled water and a solution of 11 g of sodium chloride and 0.02 mg of $K_2IrCl_6$ in 200 ml of distilled water were added to and blended with the previous solution under the condition of 40° C. over a period of 2 minutes. A solution of 64 g of silver nitrate in 280 ml of distilled water and a solution of 21.6 g of sodium chloride in 275 ml of distilled water were added to and blended under Compound (C):

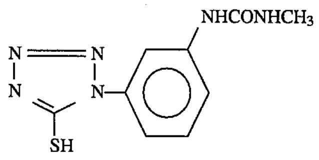

-continued

Selenium Sensitizing Agent:

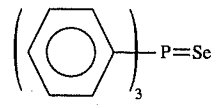

2. Preparation of Coating Emulsion (Solution):

The following chemicals were added to the Emulsion A, the amounts thereof indicated below being per mol of silver halide, to prepare a coating emulsion (solution).

Formulation of Emulsion Coating (Solution):

| | | |
|---|---|---|
| (a) | Spectral Sensitizing Dye (1) | $5.5 \times 10^{-5}$ mol |
| (b) | Supersensitizing Agent (1) | $3.3 \times 10^{-4}$ mol |
| (c) | Polyacrylamide (molecular weight: 40,000) | 9.2 g |
| (d) | Trimethylolpropane | 1.4 g |
| (e) | Latex of Poly(ethyl acrylate/ methacrylic acid) | 22 g |

3. Preparation of Surface Protective Layer Coating Solution for Protective Emulsion Layer:

A container was heated at 40° C., and the following chemicals were added thereto to prepare a coating solution.

| | | |
|---|---|---|
| (a) | Gelatin | 100 g |
| (b) | Polyacrylamide (molecular weight: 40,000) | 12.3 g |
| (c) | Sodium Polystyrenesulfonate (molecular weight: 600,000) | 0.6 g |
| (d) | Fine Grains of Polymethyl Methacrylate (mean grain size: 2.5 μm) | 2.7 g |
| (e) | Sodium Polyacrylate | 3.7 g |
| (f) | Sodium t-octylphenoxyethoxyethane-sulfonate | 1.5 g |
| (g) | $C_{16}H_{33}O-(CH_2CH_2O)_{10}-H$ | 3.3 g |
| (h) | $C_8F_{17}SO_3K$ | 84 mg |
| (i) | $C_8F_{17}SO_2N(C_3H_7)(CH_2CH_2O)_4(CH_2)_4-SO_3Na$ | 84 mg |
| (j) | NaOH | 0.2 g |
| (k) | Methanol | 78 cc |
| (l) | 1,2-Bis(vinylsulfonylacetamido)ethane to be 2.5% by weight per the total gelatin amount in the emulsion layer and the surface protective layer | |
| (m) | Compound (D) | 52 mg |
| | 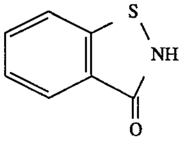 | |

4. Preparation of Backing Layer Coating Solution:

A container was heated at 40° C., and the following chemicals were added thereto to prepare a backing layer coating solution.

| | | |
|---|---|---|
| (a) | Gelatin | 100 g |
| (b) | Dye (1) | 2.38 g |
| (c) | Sodium Polystyrenesulfonate | 1.1 g |
| (d) | Phosphoric Acid | 0.55 g |
| (e) | Poly(ethyl acrylate/methacrylic acid) Latex | 2.9 g |
| (f) | Compound (D) | 46 mg |
| (g) | Oil Dispersion of Dye (2) described in JP-A-61-285445 | 246 mg (as dye) |
| (h) | Oligomer Surfactant Dispersion of Dye (3) described in JP-A-62-275639 | 46 mg (as dye) |

The compound or compounds shown in Table 1 above, which falls/fall within the scope of formula (I), was/were added to the backing layer coating solution to prepare additional four coating solutions having the constitutions shown in Table 1.

5. Preparation of Back Surface Protective Layer Coating Solution:

A container was heated at 40° C., and the following chemicals were added thereto to prepare a coating solution.

| | | |
|---|---|---|
| (a) | Gelatin | 100 g |
| (b) | Sodium Polystyrenesulfonate | 0.3 g |
| (c) | Fine Grain of Polymethyl Methacrylate (mean grain size: 3.5 μm | 4.3 g |
| (d) | Sodium T-octylphenoxyethoxyethane-sulfonate | 1.8 g |
| (e) | Sodium Polyacrylate | 1.7 g |
| (f) | $C_{16}H_{33}O-(CH_2CH_2O)_{10}-H$ | 3.6 g |
| (g) | $C_8F_{17}SO_3K$ | 268 mg |
| (h) | $C_8F_{17}SO_2N(C_3H_7)(CH_2CH_2O)_4(CH_2)_4-SO_3Na$ | 45 mg |
| (i) | NaOH | 0.3 g |
| (j) | Methanol | 131 ml |
| (k) | 1,2-Bis(vinylsulfonylacetamido)ethane to be 2.2% by weight per the total gelatin amount in the backing layer and surface-protective layer | |
| (l) | Compound (D) | 45 mg |

6. Formation of Photographic Material Sample:

Each of the thus-prepared backing layer coating solutions A to E was coated on one surface of a blue-colored polyethylene terephthalate support along with the coating solution for protecting the backing layer, the gelatin amount in the coated backing layer being 2.69 $g/m^2$ and the gelatin amount in the coated surface protective layer being 1.13 $g/m^2$.

Next, the above-mentioned emulsion layer coating solution and surface protective layer coating solution were coated on the opposite surface of the support, the coated silver amount being 1.85 $g/m^2$, the gelatin amount in the coated emulsion layer being 1.6 $g/m^2$ and the gelatin amount in the coated surface protective layer being 1.23 $g/m^2$. Thus, photographic material samples (Samples F to J) were produced.

These samples were processed in the manner shown below. As a developer, used was the concentrated developer prepared in Example 1. As a fixer, used was SR-F1 (produced by Fuji Photo Film Co., Ltd.). As an automatic developing machine, used was a modified FCR-7000 Model Laser Image Printer Type CR-LP414 (manufactured by Fuji Photo Film Co., Ltd.) in which the driving shaft was reformed so that the conveyance of a film to be processed therein from insertion of it into the machine to taking out of the processed film from the outlet of the drier needed 30 seconds.

3 $m^2$/day of each of Samples F to J was processed with the machine every day for 3 weeks, with replenishing a diluted developer and a diluted fixer each in an amount of 150 ml (50 $ml/m^2$), as a running test. The diluted developer was prepared by blending 400 ml of the concentrate developer and 600 ml of water. The diluted fixer was prepared by blending 500 ml of the concentrated fixer and 500 ml of water, In carrying out the running test, the automatic developing machine was modified in such a way that the concentrated developer and fixer were directly and automatically fed into the developer tank and the fixer tank, respectively, while water was fed to the both tanks also automatically to prepare the diluted developer and fixer in the tanks. Like the results in Example 1, the processed samples of the present invention all had excellent running properties having stable photographic properties and few silver stains even though the amounts of the replenishers of the developer and fixer tanks were reduced to 50 ml/m$^2$.

EXAMPLE 3

Preparation of Emulsion A:

| | |
|---|---|
| Solution 1: | |
| Water | 1 liter |
| Gelatin | 20 g |
| Sodium Chloride | 20 g |
| 1,3-Dimethylimidazolidine-2-thione | 20 mg |
| Sodium Benzenethiosulfonate | 8 mg |
| Solution 2: | |
| Water | 400 ml |
| Silver Nitrate | 100 g |
| Solution 3: | |
| Water | 400 ml |
| Sodium Chloride | 27.1 g |
| Potassium Bromide | 21 g |
| Potassium Hexachloroiridate (III) (0.001% aqueous solution) | 15 ml |
| Ammonium Hexabromorhodate (III) (0.001% aqueous solution) | 1.5 ml |

Solution 2 and Solution 3 were simultaneously added to Solution 1 that was maintained at 38° C. and at pH of 4.5, while stirring, over a period of 10 minutes, to form 0.16 µm-nuclear grains. Next, the following Solution 4 and Solution 5 were added thereto over a period of 10 minutes. Further, 0.15 g of potassium iodide were added thereto to finish the formation of the grains.

| | |
|---|---|
| Solution 4: | |
| Water | 400 ml |
| Silver Nitrate | 100 g |
| Solution 5: | |
| Water | 400 ml |
| Sodium Chloride | 27.1 g |
| Potassium Bromide | 21 g |
| Potassium Hexacyanoferrate (III) (0.1% aqueous solution) | 5 ml |

The emulsion thus formed was washed with water by an ordinary flocculation method, and 30 g of gelatin were added thereto.

The emulsion was adjusted to a pH of 5.3 and a pAg of 7.5, and then 2.6 mg of sodium thiosulfate, 1.0 mg of triphenylphosphine selenide and 6.2 mg of chloroauric acid were added thereto. Further, 4 mg of sodium benzenethiosulfonate and 1 mg of sodium benzenesulfinate were added thereto, and the emulsion was thus subjected to chemical sensitization at 55° C. to obtain the optimum sensitivity.

As a stabilizer, added were 200 mg of 4-hydroxy-6-methyl-1,3,3a,7-tetraazaindene; and as an antiseptic, added was phenoxyethanol. Finally obtained was an emulsion of cubic silver iodochlorobromide grains having a silver chloride content of 70 mol % and a mean grain size of 0.2 µm. This had a fluctuation coefficient of 9%.

Preparation of Photographic Samples:

$5\times10^{-4}$ mol/mol of Ag of the following compound (ortho-sensitizing dye) were added to the emulsion so as to subject it to ortho-sensitization. As antifoggant, added were hydroquinone and 1-phenyl-5-mercaptotetrazole in amounts of 2.5 g and 50 mg, respectively, per mol of Ag. As a plasticizer, added was polyethyl acrylate latex in an amount of 25% based on the gelatin binder. As a hardening agent, added was 2-bis(vinylsulfonylacetamido)ethane. Further, colloidal silica was added in an amount of 40% based on the gelatin binder. The thus-prepared coating solution was coated on a polyester support in an amount of 3.0 g/m$^2$ as Ag. Over the emulsion layer thus formed, a lower protective layer and an upper protective layer having the compositions shown below were coated at the same time.

Ortho-sensitizing Dye:

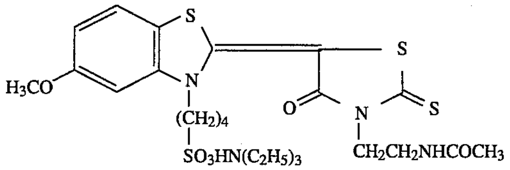

Formulation of Lower Protective Layer:

| | |
|---|---|
| Gelatin | 0.25 g/m$^2$ |
| Sodium Benzenethiosulfonate | 4 mg/m$^2$ |
| 1,5-Dihydroxy-2-benzaldoxime | 25 mg/m$^2$ |
| Polyethyl Acrylate Latex | 125 mg/m$^2$ |

Formulation of Upper Protective Layer:

| | |
|---|---|
| Gelatin | 0.25 g/m$^2$ |
| Silica Matting Agent (mean grains size: 2.5 µm | 50 mg/m$^2$ |
| Compound ① (gelatin dispersion) | 30 mg/m$^2$ |
| Colloidal Silica (grain size: 10 to 20 µm) | 30 mg/m$^2$ |
| Compound ② | 5 mg/m$^2$ |
| Sodium Dodecylbenzenesulfonate | 22 mg/m$^2$ |

Compound ①

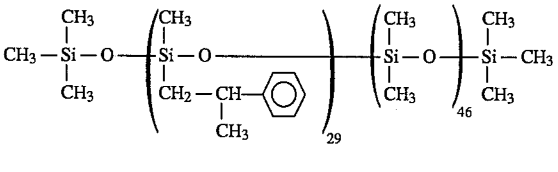

Compound ②

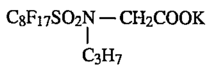

The support used in this example had a backing layer and a backing layer protective layer having the compositions shown below. The compound or compounds shown in Table 3 below, which falls/fall within the scope of formula (I), was/were added to the backing layer coating solution to prepare additional four coating solutions (five different coating solutions in all) shown in Table 3.

Composition of Backing Layer:

| | |
|---|---|
| Gelatin | 3 $g/m^2$ |
| Sodium Dodecylbenzenesulfonate | 80 $mg/m^2$ |
| Compound ③ | 70 $mg/m^2$ |
| Compound ④ | 85 $mg/m^2$ |
| Compound ⑤ | 90 $mg/m^2$ |
| 1,3-Divinylsulfone-2-propanol | 60 $mg/m^2$ |

Compound ③

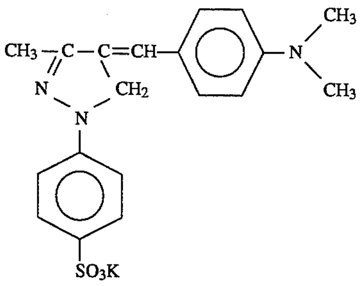

Compound ④

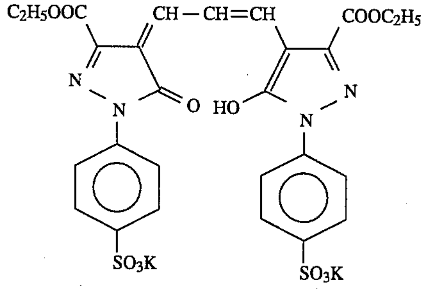

Compound ⑤

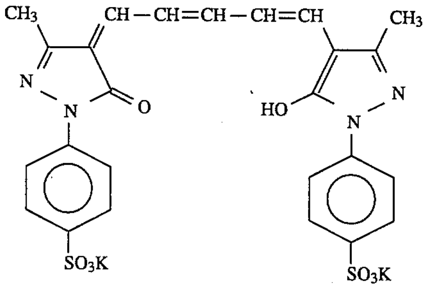

Composition of Backing Layer Protective Layer:

| | |
|---|---|
| Gelatin | 0.5 $g/m^2$ |
| Polymethyl Methacrylate Grains (grain size: 4.7 μm) | 30 $mg/m^2$ |
| Sodium Dodecylbenzenesulfonate | 20 $mg/m^2$ |
| Compound ② | 2 $mg/m^2$ |
| Compound ① (gelatin dispersion) | 100 $mg/m^2$ |

TABLE 3

| | Backing Layer Coating Liquid | Amount of Compound(s) |
|---|---|---|
| A | (comparative sample) | No compound was added. |
| B | (sample of the present invention) | 40 $mg/m^2$ of Compound (5) were added. |
| C | (sample of the present invention) | 40 $mg/m^2$ of Compound (6) were added. |
| D | (comparative sample) | 15 $mg/m^2$ of Compound (24) and 40 $mg/m^2$ of Compound (28) were added. |
| E | (sample of the present invention) | 40 $mg/m^2$ of Compound (6), 15 $mg/m^2$ of Compound (24) and 40 $mg/m^2$ of Compound (28) were added. |

Compounds (24) and (28) added to Coating Solutions D and E are compounds described in JP-A-3-266831 and JP-A-4-43343.

Thus, photographic film samples (Samples A to E) were prepared. In the same manner, photographic film samples (Samples F to J) were prepared, corresponding to Samples A to E, respectively, except that the chemical sensitizing agent of triphenylphosphine selenide was replaced by triphenylphosphine telluride.

The following developer was used for processing the samples.

Developer:

| | |
|---|---|
| Diethylenetriamine-pentaacetic Acid | 2.0 g |
| Sodium Carbonate | 11.0 g |
| Sodium Sulfite | 90.0 g |
| Sodium Bromide | 8.6 g |
| 5-Methylbenzotriazole | 0.08 g |
| 2,3,5,6,7,8-Hexahydro-2-thioxo-4-(1H)-quinazoline | 0.3 g |
| Sodium 2-Mercaptobenzimidazole-5-sulfonate | 0.2 g |
| Hydroquinone | 40.0 g |
| 4-Hydroxymethyl-4-methyl-1-phenyl-3-pyrazolidone | 1.4 g |
| Erysorbic Acid | 5.3 g |
| Water to make (after pH adjustment) | 1 liter |
| pH (adjusted with sodium hydroxide) | 10.7 |

As a fixer, used was "SR-F1" (produced by Fuji Photo Film Co., Ltd.). The amount of the replenisher of the fixer was 80 $ml/m^2$.

The film samples were exposed to a xenon flash for $10^{-6}$ seconds via an interference filter having a peak at 488 nm and a continuous optical wedge.

The thus-exposed samples were subjected to a running test, using "FG-680A" (manufactured by Fuji Photo Film Co., Ltd.). The dynamic opening ratio of the development tank part of the automatic developing machine was changed to 0.2, by reforming the driving system and reducing the opening area of the tank part. The sheet sample films having a big cabinet size (50.8 cm×60.1 cm), that had been half-exposed in the manner as described above, were processed in an amount of 40 sheets a day, while the machine was run for 10 hours a day. One running round comprised continuous 6-days on and one-day off before the next 6-days on. Six running rounds were carried out for each sample. The amount of the replenisher of the developer during the running test is shown in Table 4 below. The developing time was 20 seconds, and the developing temperature was 38° C.

TABLE 4

| Test No. | Sample | Amount of Replenisher ($ml/m^2$) | Photographic Properties | Fresh Solutions | Fatigued Solutions | Silver Stains | Remarks |
|---|---|---|---|---|---|---|---|
| 1 | Sample A | 160 | Sensitivity | 100 | 98 | 2 | Comparative Sample |
| | | | Gradation | 6.00 | 5.95 | | |
| | | | Fog | 0.04 | 0.04 | | |
| 2 | Sample B | 160 | Sensitivity | 100 | 97 | 4 | Sample of the Present Invention |
| | | | Gradation | 6.00 | 5.92 | | |
| | | | Fog | 0.04 | 0.04 | | |
| 3 | Sample C | 160 | Sensitivity | 100 | 97 | 4 | Sample of the Present Invention |
| | | | Gradation | 6.00 | 5.89 | | |
| | | | Fog | 0.04 | 0.04 | | |
| 4 | Sample D | 160 | Sensitivity | 100 | 98 | 3 | Comparative Sample |
| | | | Gradation | 6.00 | 5.95 | | |
| | | | Fog | 0.04 | 0.04 | | |
| 5 | Sample E | 160 | Sensitivity | 100 | 95 | 5 | Sample of the Present Invention |
| | | | Gradation | 6.00 | 5.90 | | |
| | | | Fog | 0.04 | 0.04 | | |
| 6 | Sample A | 80 | Sensitivity | 100 | 92 | 1 | Comparative Sample |
| | | | Gradation | 6.00 | 5.85 | | |
| | | | Fog | 0.04 | 0.04 | | |
| 7 | Sample B | 80 | Sensitivity | 100 | 93 | 4 | Sample of the Present Invention |
| | | | Gradation | 6.00 | 5.88 | | |
| | | | Fog | 0.04 | 0.04 | | |
| 8 | Sample C | 80 | Sensitivity | 100 | 93 | 4 | Sample of the Present Invention |
| | | | Gradation | 6.00 | 5.87 | | |
| | | | Fog | 0.04 | 0.04 | | |
| 9 | Sample D | 80 | Sensitivity | 100 | 91 | 3 | Comparative Sample |
| | | | Gradation | 6.00 | 5.88 | | |
| | | | Fog | 0.04 | 0.04 | | |
| 10 | Sample E | 80 | Sensitivity | 100 | 93 | 4 | Sample of the Present Invention |
| | | | Gradation | 6.00 | 5.90 | | |
| | | | Fog | 0.04 | 0.04 | | |

The photographic properties of the processed samples were evaluated in the manner shown below. The gradation was obtained by dividing the difference between the density 3.0 and the density 0.1 by the difference between the logarithm of the exposure amount that gave the density 3.0 and the logarithm of the exposure amount that gave the density 0.1. The sensitivity indicates a reciprocal of the exposure amount necessary for obtaining a density 1.5, and it has been represented by a relative value to the standardized sensitivity (100) of the sample of Test No. 1 (Table 4) that had been processed with the fresh solutions.

The silver stains were checked with the naked eye on the basis of the following five ranks. "5" indicates that there were no silver stains on the processed films and also in the development tank and on the rollers used. "1" indicates that noticeable silver stains formed on the whole surfaces of the processed films and also in the development tank and on the rollers used. "4" indicates that some silver stains formed in the development tank and on the rollers used though not formed on the processed films. This is in a practical level. "3" and below indicate that the film samples were problematic in practical use or they were not in a practical level.

The results of the running tests are shown in Table 4 above.

As is apparent from the results, the running processability of the photographic material samples of the present invention was good. Specifically, the processed samples of the present invention all had stable photographic properties and few silver stains even though the amount of the replenishers of the developer was reduced to 80 $ml/m^2$.

Next, Samples F to J were tested in the same manner as above, resulting in the same results that the samples of the present invention all had few silver stains and were good.

As has been explained in detail in the above, the photographic materials of the present invention which contain compound(s) represented by formula (I) can well be processed for a long period of time even with fatigued processing solutions with replenishing reduced amounts of replenishers thereto, and the processed materials have stable photographic properties and few silver stains.

Further, the preferable embodiments for the present invention are shown below.

The method for processing a silver halide photographic material is a method for processing a silver halide photographic material comprising a support having at least one silver halide emulsion layer on one surface of the support and having a backing layer on the back surface of the support, wherein the backing layer contains a compound represented by formula (I):

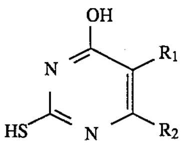

(I)

wherein $R_1$ and $R_2$, each represents a hydrogen atom, an alkyl group, an aryl group, an aralkyl group, a hydroxyl group, a mercapto group, a carboxyl group, a sulfo group, a phosphono group, a nitro group, a cyano group, a halogen atom, an alkoxycarbonyl group, an aryloxycarbonyl group, a carbamoyl group, a sulfamoyl group or an alkoxy group; the sum of the carbon atoms contained in $R_1$ and $R_2$ is from 2 to 20; and $R_1$ and $R_2$ may be bonded to each other to form a ring structure; with a developer.

(1) In the above method, a silver halide photographic material having a silver amount of 3.0 g or less per $m^2$ of the material as Ag on one side surface of the support and a total gelatin amount of 3.5 $g/m^2$ or less is used.

(2) In the above method, the concentrated developer and the concentrated fixer, each is in one part, they each is diluted with water in each their tanks, and the diluted solutions are fed to the developing machine as replenishers.

(3) In the above method, the container of the concentrated developer and that of the concentrated fixer are integrated and packaged into one unit.

(4) In the above method, both the amount of the concentrated developer and that of the concentrated fixer in each their tanks are consumed at the same time.

(5) In the above method, an automatic developing machine having a rinsing tank and rinsing rollers or cross-over rollers between the developing tank and the fixing tank and between the fixing tank and the washing tank is used.

(6) In the above method, an automatic developing machine having a water-storing tank from which water is fed to the washing tank and to the rinsing tank, and the water-storing tank containing a microbicide is used.

(7) In the above method, an automatic developing machine having an electromagnetic valve at the drain mouth (i.e., the exhaust port) of the washing tank is used.

(8) In the above method, the whole processing time is from 20 seconds to 120 seconds as a dry-to-dry time.

(9) In the above method, an automatic developing machine having, in the preceding part of the drying zone, a heating means which heats the rollers to be in contact with the photographic material processed, at 70° C. or higher is used.

(10) In the above method, the developer and the fixer are in the form of running solutions.

While the invention has been described in detail and with reference to specific embodiments thereof, it will be apparent to one skilled in the art that various changes and modifications can be made therein without departing from the spirit and scope thereof.

What is claimed is:

1. A black-and-white silver halide photographic material comprising a support having at least one silver halide emulsion layer on one surface of the support and having a silver halide free-backing layer on the opposite surface of the support, wherein the backing layer contains a compound represented by formula (I):

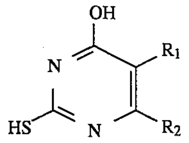

(I)

wherein $R_1$ and $R_2$ each represents a hydrogen atom, an alkyl group, an aryl group, an aralkyl group, a hydroxyl group, a mercapto group, a carboxyl group, a sulfo group, a phosphono group, a nitro group, a cyano group, a halogen atom, an alkoxycarbonyl group, an aryloxycarbonyl group, a carbamoyl group, a sulfamoyl group or an alkoxy group; the sum of the carbon atoms contained in $R_1$ and $R_2$ is from 2 to 20; and $R_1$ and $R_2$ may be bonded to each other to form a ring structure.

2. The silver halide photographic material as claimed in claim 1, wherein the backing layer further contains at least one compound represented by formulae (II) and (III):

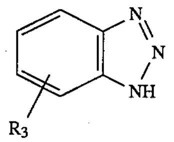

(II)

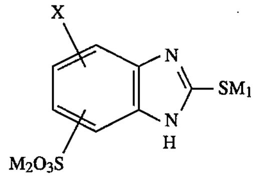

(III)

wherein $R_3$ represents a hydrogen atom, an alkyl group having from 1 to 5 carbon atoms, or a halogen atom; X represents a hydrogen atom or a sulfonic acid group; $M_1$ represents a hydrogen atom or an alkali metal atom; and $M_2$ represents a hydrogen atom, an alkali metal atom or an ammonium group.

3. A method for processing an exposed black-and-white silver halide photographic material by bringing the exposed material into contact with a developer, the material comprising a support having at least one silver halide emulsion layer on one surface of the support and having a silver halide free-backing layer on the opposite surface of the support, wherein the backing layer contains a compound represented by formula (I):

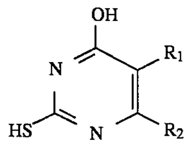

(I)

wherein $R_1$ and $R_2$ each represents a hydrogen atom, an alkyl group, an aryl group, an aralkyl group, a hydroxyl group, a mercapto group, a carboxyl group, a sulfo group, a phosphono group, a nitro group, a cyano group, a halogen atom, an alkoxycarbonyl group, an aryloxycarbonyl group, a carbamoyl group, a sulfamoyl group or an alkoxy group; the sum of the carbon atoms contained in $R_1$ and $R_2$ is from 2 to 20; and $R_1$ and $R_2$ may be bonded to each other to form a ring structure.

4. The method as claimed in claim 3, wherein a replenisher is added to the developer in an amount of 200 $ml/m^2$ of material being processed or less.

5. The method as claimed in claim 3, wherein the backing layer further contains at least one compound represented by formulae (II) and (III):

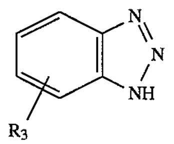

(II)

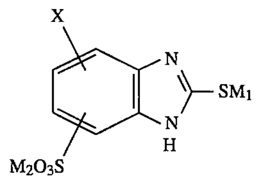

(III)

wherein $R_3$ represents a hydrogen atom, an alkyl group having from 1 to 5 carbon atoms, or a halogen atom; X represents a hydrogen atom or a sulfonic acid group; $M_1$ represents a hydrogen atom or an alkali metal atom; and $M_2$ represents a hydrogen atom, an alkali metal atom or an ammonium group.

6. The method as claimed in claim 3, wherein the silver halide photographic material has a total silver amount of 3.0 g or less per $m^2$ of the material as Ag on said one surface of the support and a total gelatin amount of 3.5 $g/m^2$ or less on said one surface of the support.

7. The method as claimed in claim 3, wherein the backing layer contains the compound represented by formula (I) in an amount of from 0.1 mg to 1 g per $m^2$ of the material.

8. The silver halide photographic material as claimed in claim 1, wherein the backing layer contains the compound represented by formula (I) in an amount of from 0.1 mg to 1 g per $m^2$ of the material.

* * * * *